United States Patent [19]

Brilando

[11] 4,103,922
[45] Aug. 1, 1978

[54] QUICK-RELEASE HUB RETENTION DEVICE

[75] Inventor: Frank P. Brilando, Niles, Ill.

[73] Assignee: Schwinn Bicycle Company, Chicago, Ill.

[21] Appl. No.: 736,328

[22] Filed: Oct. 28, 1976

[51] Int. Cl.$^2$ .............................................. B62K 25/02
[52] U.S. Cl. ................................................... 280/279
[58] Field of Search ............... 280/279, 276, 287, 289; 301/132, 125

[56] References Cited

U.S. PATENT DOCUMENTS

| 624,442 | 5/1899 | Baker | 280/279 |
|---|---|---|---|
| 2,630,020 | 3/1953 | Juy | 301/125 |
| 3,610,659 | 10/1971 | Gerarde | 280/279 |
| 3,807,761 | 4/1974 | Brilando | 280/279 |
| 3,894,751 | 7/1975 | Fuhrman | 280/279 |

FOREIGN PATENT DOCUMENTS

| 454,480 | 7/1913 | France | 301/125 |
|---|---|---|---|
| 331,556 | 1919 | Fed. Rep. of Germany | 301/125 |

Primary Examiner—Joseph F. Peters, Jr.
Assistant Examiner—Donn McGiehan

[57] ABSTRACT

Open-ended slots in lower ends of bicycle front fork legs receive front wheel axle in usual manner, but to prevent accidental separation of wheel from fork even if regular retaining means on axle became loose, safety means are provided comprising a pair of longitudinally flexible clips mounted at lower ends on axle with retainer means formed integrally therewith at upper ends, and receiver means adjacent lower end of each front fork leg for cooperatively receiving such retainer means, manual flexing of clips being required to effect disengagement of wheel axle from fork.

6 Claims, 9 Drawing Figures

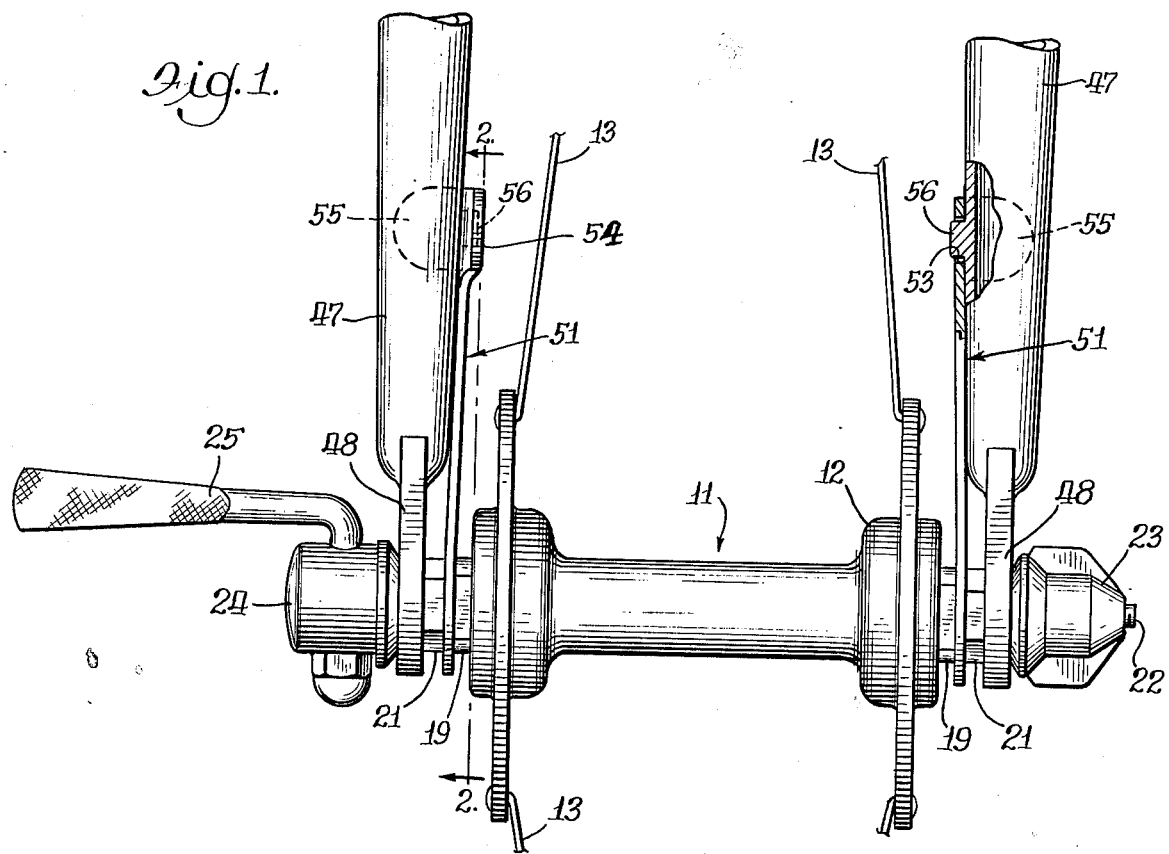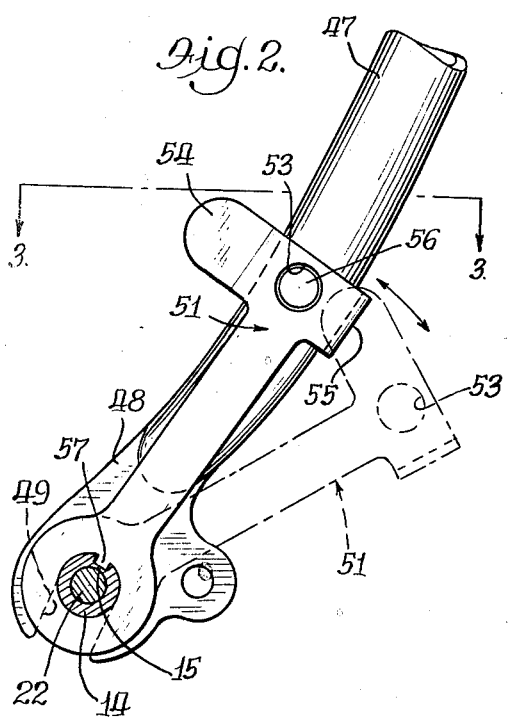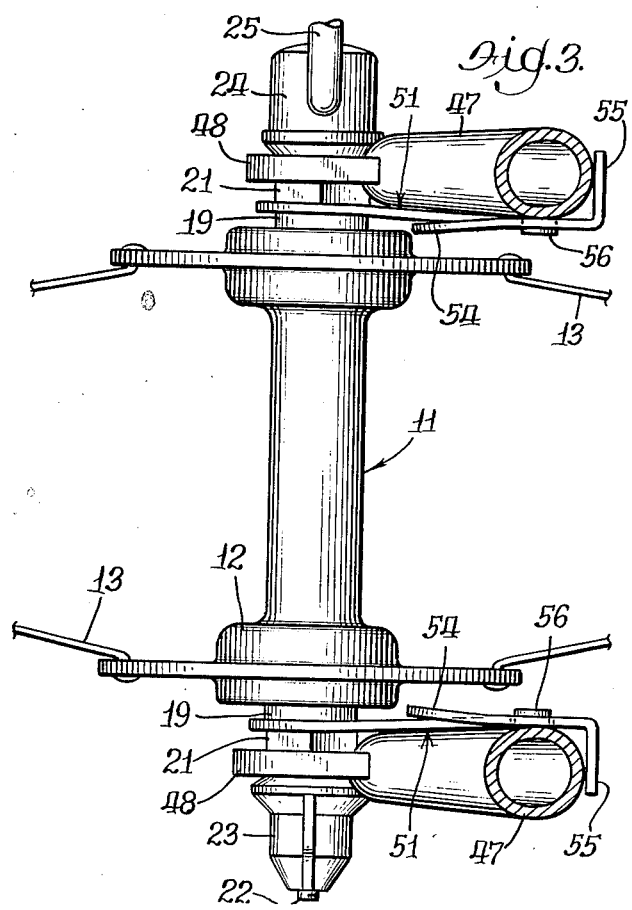

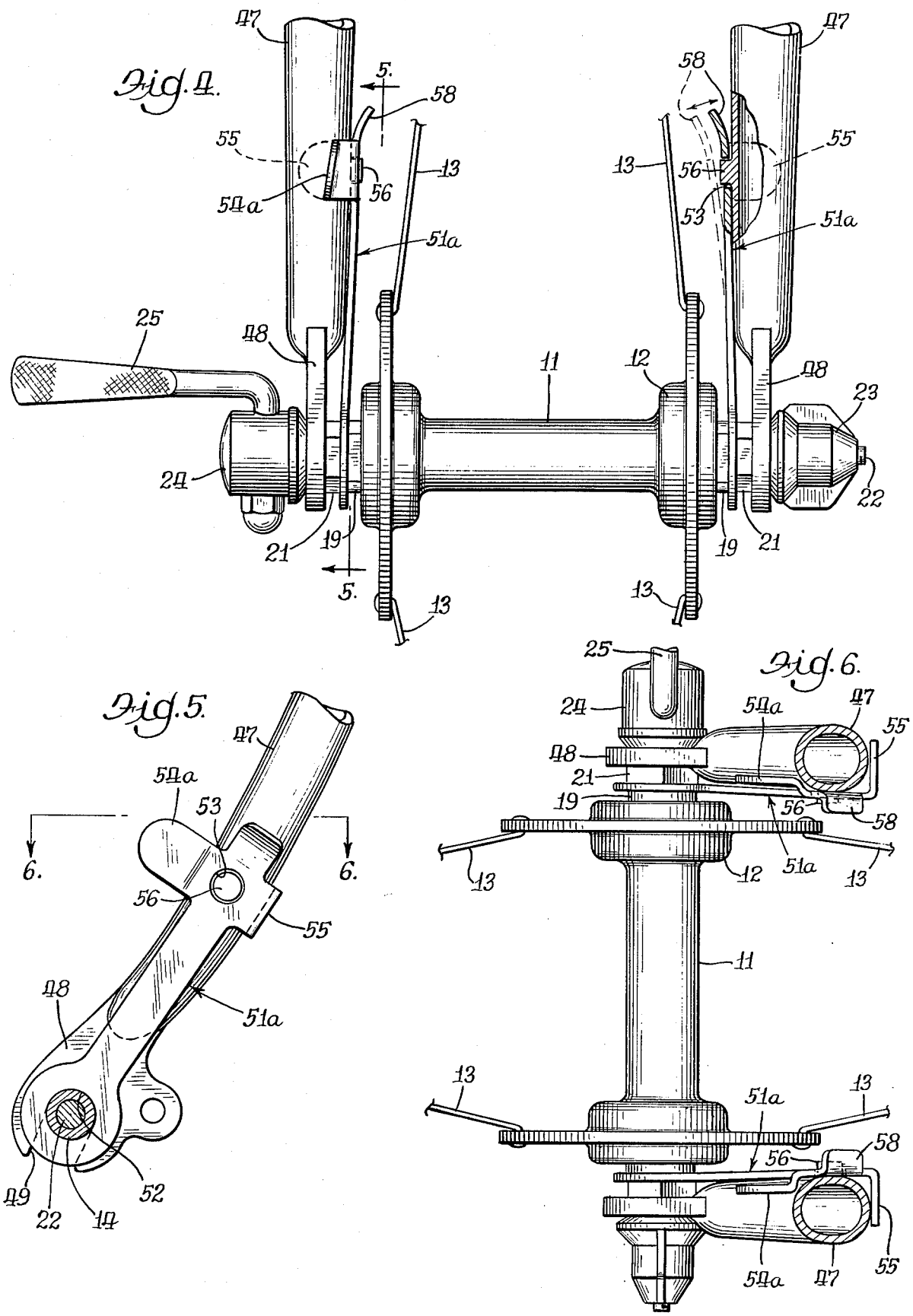

U.S. Patent  Aug. 1, 1978  Sheet 3 of 3  4,103,922
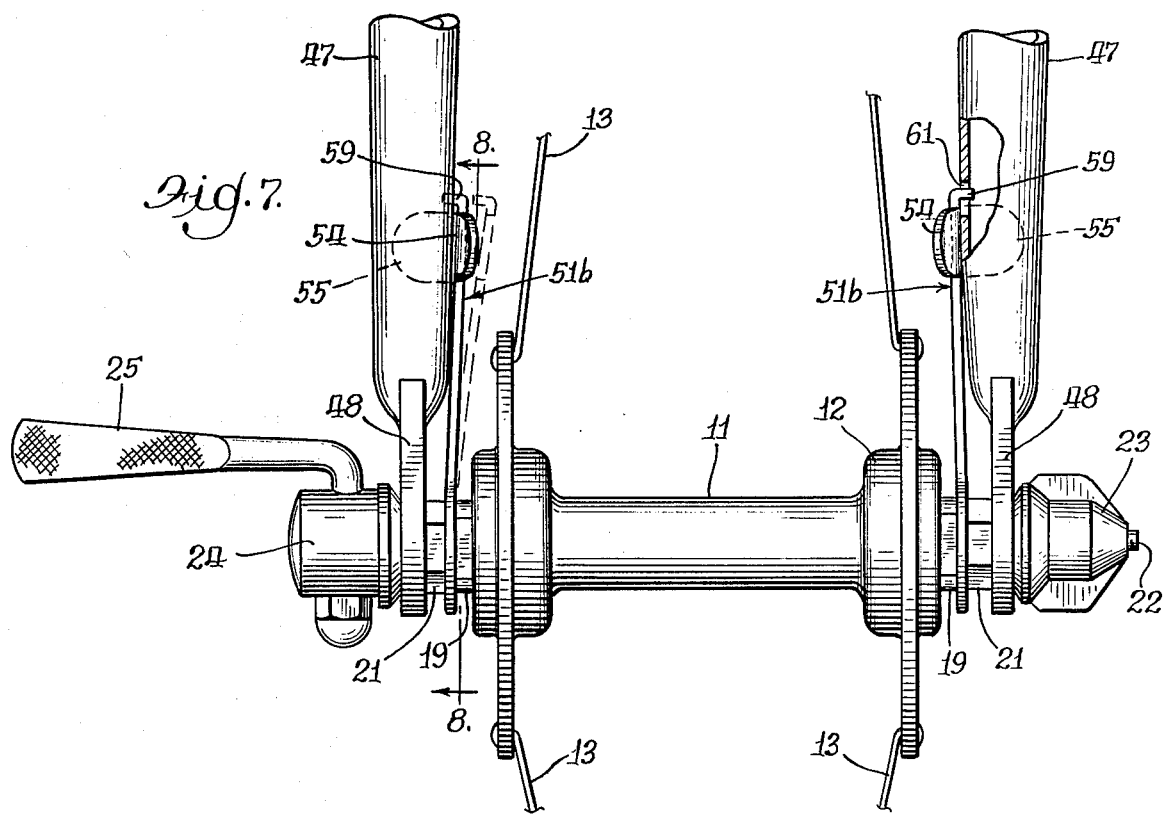
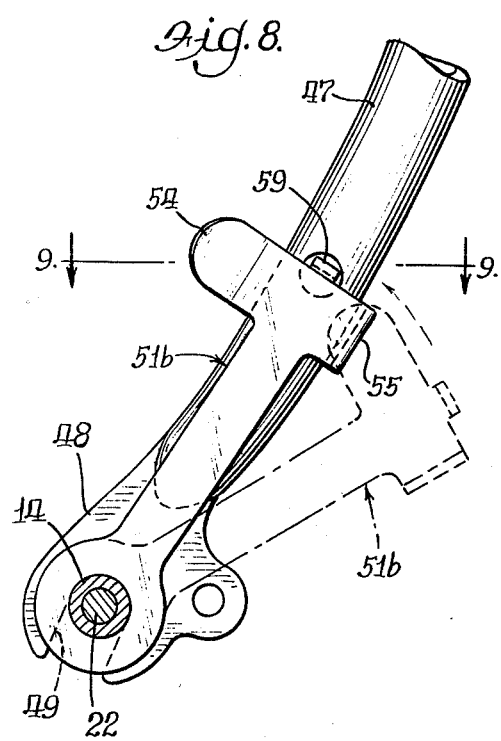
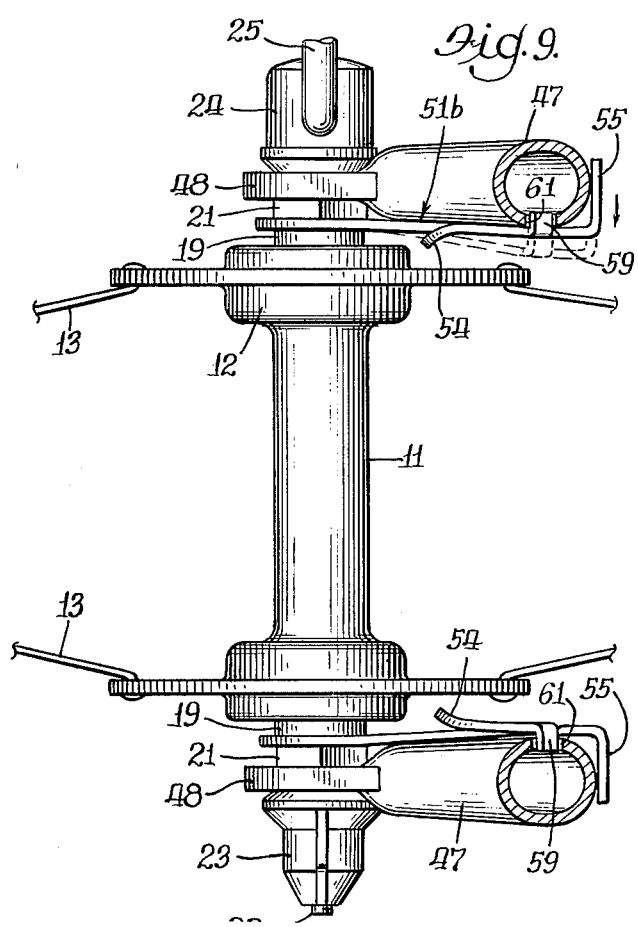

4,103,922

QUICK-RELEASE HUB RETENTION DEVICE

BACKGROUND OF THE INVENTION

1. Field of the Invention

This invention relates generally to bicycles, and more particularly to the mounting of front wheel quickrelease hubs.

2. Description of the Prior Art

It is customary to mount the front wheel, hub and axle assembly in open-ended slots in the lower ends of the legs of the front fork of a bicycle, with the axle being held in the slots by retaining nuts threadedly mounted on the outer ends of the axle and lock washers, and quick-release means have been incorporated therein including adjustable retainer members movable relative to and longitudinally of the axle for clampingly retaining the axle in the fork slots. Because accidents have occurred when such retaining nuts or retainer members have become loose enabling separation of the front wheel from the fork, attempts have been made to provide additional retainer means for preventing such accidental separation. One that is applicable to quick-release hubs is disclosed in U.S. Letters Pat. No. 3,807,761 which incorporates a pair of clips pivotally mounted on the lower ends of the fork legs manually swingable between inoperative position and an operative position in which they block the open-ended slots. But all known attempts have proven to be commercially impractical and expensive to incorporate in a quick-release hub. For example, that last noted requires a special end piece for the front fork legs on which the clips are mounted and separate friction mounting means for retaining the clips in selected operative or inoperative positions.

SUMMARY OF THE INVENTION

The present invention provides a more economical solution than the devices of the prior art which is commercially feasible and comprises a pair of retainer clips having their lower ends mounted on the axle of a quick-release hub and retainer means formed integrally with their upper ends for interengagement with receiving means adjacent the lower ends of the legs of the front fork of a bicycle which positively prevent accidental separation of the hub and the fork even though the regular retainer nuts and the adjustable retainer members accidentally become loose. To this end, the retainer clips are flexible longitudinally so that their upper end retainer means may be intentionally separated from their associated fork leg receiving means to enable removal of the hub from the fork when desired. However, the clips themselves maintain the operative interengagement of their retainer means with the fork leg receiving means to prevent accidental separation of the hub and the fork, and no separate friction mounting means which is susceptible of accidentally becoming loose is employed for these novel retainer clips.

The invention may be incorporated into existing quickrelease hubs without requiring modification thereof, and the only modification of present commercial front forks that may be necessary would be the addition of a stud to, or a hole in, the lower portion of each front fork leg.

The invention also contemplates the use of cam means on the upper portions of the flexible clips which, as the quick-release hub is moved into operative engagement with the axle in the open-ended slots of the fork, will cause flexing of the clips by the fork legs in a caming action until the clip retainer means are aligned with the leg receiving means, when they will automatically be engaged with each other merely by the return of the clips to their normal unflexed condition.

In the drawings:

FIG. 1 is a front elevational view, with parts broken away, of a quick-release hub mounted in the lower ends of a bicycle fron fork and incorporating a preferred embodiment of the instant safety mounting;

FIG. 2 is a vertical sectional view taken substantially on the line 2—2 in FIG. 1;

FIG. 3 is a horizontal sectional view as seen along the line 3—3 of FIG. 2;

FIG. 4 is a front elevational view, with parts broken away, similar to FIG. 1 showing retainer clips of slightly modified form;

FIG. 5 is a vertical section taken substantially on the line 5—5 of FIG. 4;

FIG. 6 is a horizontal section taken substantially on the line 6—6 of FIG. 5;

FIG. 7 is a front elevational view with parts broken away, similar to FIGS. 1 and 4, showing retainer clips of a second modified form;

FIG. 8 is a vertical section taken substantially on the line 8—8 of FIG. 7; and

FIG. 9 is a horizontal section taken substantially on the line 9—9 of FIG. 8.

DESCRIPTION OF THE PREFERRED EMBODIMENT

The present invention is shown in the drawings as comprising a safety mounting for quick-release hubs. The example of the latter is the same as that illustrated and described in detail in U.S. Letters Pat. No. 3,807,761. This quick-release hub is designated generally by reference numeral 11 and includes a shell with end cups 12 and supporting and having attached thereto the usual wheel spokes 13, and a hollow axle 14, as best seen in FIG. 2. The outer ends of that axle 14 have outwardly threaded end portions, each with an axially extending keyway 15. The end cups 12 are rotatably supported on the axle 14 and bearings adjacent each end of the latter in well known manner and retained thereon by lock washers 19 (FIG. 1) and locking or retaining nuts 21. As is also well understood in the art, a quick-release unit is incorporated in the hub 11 in the form of a mounting stud or rod 22 extending axially through the hollow axle 14 and having adjustable retainer members on its ends comprising a nut 23 (FIG. 1) and an eccentric 24 movable relative to the stud 22 longitudinally thereof by a manually operable lever 25.

The drawings illustrate only the lower portions of a pair of legs 47 of the front fork of a bicycle, each having a lower end piece 48 mounted therein and depending therefrom in well known manner. As will be understood by one skilled in the art, these legs may be forged or tubular (as shown herein) and the end pieces 48 are each provided with the usual axle-receiving open-ended slot 49 (FIG. 2). The axle 14 of the quick-release hub 11 is illustrated as being seated in the upper ends of these slots 49 with the fork end pieces 48 disposed between the lock nuts 21 and their associated adjustable retainer members 23, 24. As also is well known, following upward movement of the wheel and its hub 11 to so engage the axle 14 in the slots 49, actuation of the manually operable lever 25 will draw the two retaining members 23, 24 together or toward each other to clampingly engage against the outer surfaces of the respective fork arm end pieces 48. The reference numerals so far employed herein are the same as those used in said U.S. Pat. No. 3,807,761.

The present invention provides axle retaining clip means, the preferred embodiment of FIGS. 1–3 comprising a clip member indicated generally by reference numeral 51 mounted adjacent each end of the quick-release hub 11 between the associated lock washers 19 and retaining nuts 21. To this end, the lower portion of each clip 51 is provided with an aperture 52 (FIG. 2) for receiving the axle 14. The upper end of each clip member 51 is provided with retainer means formed integrally therewith comprising an aperature 53, a forwardly extending caming finger piece 54 (to the left in FIG. 2) and a laterally extending tab 55 (FIGS. 1 and 3).

Adjacent the lower end of the front fork legs 47, is provided a receiving means shown in FIGS. 1–3 as a stud 56 for cooperation with the aperture 53 in the associated clip member 51. It will be understood that these studs 56 may be formed in any suitable manner, as by forging during the manufacture of the front fork or by drilling suitable holes in the fork legs and inserting the studs therein. This is the only modification of an existing front fork that may be required in the use of the present invention.

In mounting a quick-release hub incorporating the clip members 51 in the front fork of a bicycle, the clip members are disposed in their broken line position of FIG. 2 as the front fork pieces 48 are moved into seating engagement with the axle 14 disposed in the open-ended slots 49. The upper ends of the clip members 51 then are flexed inwardly to clear the studs 56 and rotated forwardly to their full line position of FIG. 2. In this connection, it will be appreciated that such flexing of the clip members may be effected by caming engagement of the finger pieces 54 with the fork legs 47 and the studs 56 in response to forward manual pressure against the tabs 55. When the latter are substantially in contact with the fork legs 47, the studs 56 will be aligned with the apertures 53 and interengagement thereof will result automatically from release of the clip flexing forces permitting the clips 51 to unflex or return to their normal condition.

To facilitate the desired initial positioning of the two clip members 51, they may be provided in their apertures 52 with a key 57 for engagement in the associated keyway 15. Thus, when either of the clip members 51 is rotated relative to the hub 11, it will rotate the axle 14 to impart similar arcuate movement to the other clip member 51.

The modification of FIGS. 4–6 differs from that of FIGS. 1–3 only in that each clip member 51a has a finger piece 54a bent or offset from the main body of the clip at its rear end to define, with the laterally extending tab 55, a guide means for loosely embracing the associated fork leg 47 as the latter is moved downwardly relative to the hub 11, and an inwardly inclined cam lip 58 at its upper end. The cam lip 58 cooperates with the associated fork leg and its stud 56 to flex the clip and move its upper portion to align the retainer means or aperture 53 with the stud or receiving means 56 as the fork and hub are interengaged with the axle 14 disposed in the upper ends of the open-ended slots 49. It will be understood that this normally is accomplished by aligning the clips 51a vertically with the associated fork legs 47 and moving the latter downward relative to the hub 11. When the retainer and receiving means 53, 56 are thus aligned, they are automatically interengaged by the resulting unflexing or return of the clips to normal position. To separate the wheel and the hub intentionally after the quick-release lever 25 has been actuated to release position, it is only necessary to flex the clips 51a inwardly from the full line to the broken line position shown with the righthand clip in FIG. 4 and swing the clips downwardly by means of the finger pieces 54a. To facilitate such clip release, it may be desirable to omit the key 57 shown in FIG. 2 so that the two clips may be released separately. To this end, it may be found desirable to provide a shoulder on the inner ends of the retaining nuts 21 to receive the apertures 52 of the clips 51a and journal the clips thereon, such shoulders being slightly wider than the thickness of the clips.

FIG. 7–9 illustrate a second modification in which the clip members 51b are each provided with an outwardly extending tab 59 at their upper ends for interengagement with a hole or aperture 61 in the inner side of each fork leg 47. As in the preferred embodiment of FIGS. 1–3, engagement and disengagement of the retainer and receiving means 59,61 of FIGS. 7–9 may be effected by flexing the clip 51b and rotating it relative to the associated leg 47 by means of the finger piece 54 or the laterally extending tab 55.

With each of the clip members 51, 51a and 51b it now will be appreciated that their proper alignment with the fork legs 47 and actuation, as above described, when mounting on axle 14 of a quick-release hub 11 in the open-ended slots 49 in the end pieces 48 of the fork, will positively retain the hub and wheel in the fork even if the adjustable retainers 22-25 and the regular retaining nuts 21 accidentally become loose. Consequently, the objects of the invention of providing ease of intentional separation of a quick-release hub from a front fork of a bicycle while positively preventing accidental separation have been attained economically and with only nominal alteration of the existing fork structure. Rather than blocking the open ends of the slots 49 and having to rely upon some additional screw retaining means which is subject to accidental loosening, the clip members of this invention cannot become loosened accidentally.

Another very important feature is that the safety mounting of this invention may be employed with a quick-release hub without in any way disturbing the adjustment of the retaining members 23, 24 and the primary manually operable lever 25. In other words, after the initial adjustment of the retaining members 23, 24 the quick-release hub embodying the instant retainer clips may be separated intentionally from the fron fork and reassembled therewith any desired number of times without disturbing such initial adjustment.

The embodiments of the invention in which an exclusive property or privilege is claimed are defined as follows:

1. A safety mounting for a bicycle quick-release hub having an axle engageable in open-ended slots in the lower ends of the legs of the front fork of the bicycle for receiving said axle, and a quick-release unit including adjustable retainer members movable relative to said axle longitudinally thereof for clampingly retaining said axle in said slots; comprising a pair of flexible retainer clips, each having a lower end mounted on said axle and an upper end with retainer means formed integrally therewith, and receiving means for cooperatively receiving a said retainer means and disposed on the laterally inner portion, and adjacent said lower end, of each of said front fork legs to prevent accidental separation of said hub from said fork despite release of said adjustable retainer members.

2. A safety mounting according to claim 1, wherein said retainer clips are flexible longitudinally to enable intentional manual separation of said retainer means from said receiving means.

3. A safety mounting according to claim 1, wherein said retainer means comprises an aperture in each said clip and said receiving means comprises a stud on each said front fork leg.

4. A safety mounting according to claim 1, wherein said retainer means comprises a tab on each said clip and said receiving means comprises an aperture in each said front fork leg.

5. A safety mounting according to claim 1, wherein said axle has a longitudinally extending keyway adjacent each end, and each said clip has a key thereon for engagement in a said keyway, whereby rotational movement of one of said clips about the axis of said axle will cause similar movement of the other of said clips.

6. A safety mounting according to claim 2, wherein each said clip is provided with a cam lip at its upper end for engaging the associated fork leg, as said hub is moved into said fork to position said axle in said open-ended slots, to flex the associated said clip and move the upper portion thereof to align said retainer means thereon with the associated receiver means and permit automatic interengagement thereof by the resulting unflexing of said clip.

* * * * *